(12) United States Patent
Kwon et al.

(10) Patent No.: US 11,358,522 B2
(45) Date of Patent: Jun. 14, 2022

(54) LAMP FOR VEHICLE

(71) Applicant: SL Corporation, Daegu (KR)

(72) Inventors: Min Jae Kwon, Gyeongsan-si (KR); Seung Ho Jeong, Gyeongsan-si (KR); Gyeong Ho Choi, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/085,075

(22) Filed: Oct. 30, 2020

(65) Prior Publication Data
US 2021/0170940 A1 Jun. 10, 2021

(30) Foreign Application Priority Data
Dec. 5, 2019 (KR) .......................... 10-2019-0160767

(51) Int. Cl.
*B60Q 1/34* (2006.01)
*B60Q 11/00* (2006.01)
*F21S 43/10* (2018.01)
*F21Y 113/17* (2016.01)
*B60Q 1/48* (2006.01)

(52) U.S. Cl.
CPC ................. *B60Q 1/34* (2013.01); *B60Q 1/48* (2013.01); *B60Q 11/007* (2013.01); *F21S 43/10* (2018.01); *B60Q 2400/30* (2013.01); *F21Y 2113/17* (2016.08)

(58) Field of Classification Search
CPC .......... B60Q 1/34; B60Q 1/48; B60Q 11/007; B60Q 2400/30; F21Y 2113/17; F21S 43/10
See application file for complete search history.

(56) References Cited

U.S. PATENT DOCUMENTS

| 2005/0134447 A1* | 6/2005 | Su .......................... B60Q 1/2665 340/463 |
| 2005/0269480 A1* | 12/2005 | Ford .................... F21V 33/0076 250/200 |
| 2012/0242227 A1* | 9/2012 | Miller .................... H05B 45/46 315/77 |

(Continued)

FOREIGN PATENT DOCUMENTS

| DE | 102013207587 A1 * | 11/2013 | .............. H04W 4/04 |
| EP | 3421328 B1 * | 10/2019 | ......... B62D 15/0285 |

(Continued)

*Primary Examiner* — Abdullah A Riyami
*Assistant Examiner* — Syed M Kaiser
(74) *Attorney, Agent, or Firm* — United One Law Group LLC; Kongsik Kim; Jhongwoo Peck

(57) ABSTRACT

A lamp for a vehicle includes a lamp unit including a plurality of light emitting areas arranged in a direction; a mode determination unit configured to determine a selected light emitting mode among a plurality of light emitting modes of the lamp unit; and a control unit configured to cause at least one of the plurality of light emitting areas to generate light having a first color or a second color based on the determined light emitting mode. In particular, the plurality of light emitting modes comprises: a first light emitting mode in which the light of the first color is generated from the plurality of light emitting areas; and a second light emitting mode in which the light generated from each of the plurality of light emitting areas is changed from the first color to the second color sequentially.

19 Claims, 14 Drawing Sheets

< THIRD LIGHT EMITTING MODE >

(56) References Cited

U.S. PATENT DOCUMENTS

| | | | | |
|---|---|---|---|---|
| 2014/0361738 A1* | 12/2014 | Lee | ........................ | H02J 50/80 |
| | | | | 320/108 |
| 2015/0296599 A1* | 10/2015 | Recker | ................... | H05B 47/16 |
| | | | | 315/153 |
| 2018/0051869 A1* | 2/2018 | Belliveau | ................ | F21V 21/15 |
| 2018/0279454 A1* | 9/2018 | Takeshita | ........... | G03B 21/2066 |
| 2019/0077427 A1* | 3/2019 | Itagaki | .................... | B60L 15/40 |

FOREIGN PATENT DOCUMENTS

| | | | | | |
|---|---|---|---|---|---|
| EP | 3799533 A1 | * | 3/2021 | ........... | H05B 47/115 |
| JP | 2011195032 A | * | 10/2011 | | |
| WO | WO-2019082615 A1 | * | 5/2019 | ............. | F21S 43/14 |
| WO | WO-2019155832 A1 | * | 8/2019 | ............. | F21S 43/10 |

* cited by examiner

< FIRST LIGHT EMITTING MODE >

< FIRST LIGHT EMITTING MODE >

< SECOND LIGHT EMITTING MODE >

< THIRD LIGHT EMITTING MODE >

< FOURTH LIGHT EMITTING MODE >

< FIFTH LIGHT EMITTING MODE >

LAMP FOR VEHICLE

CROSS-REFERENCE TO RELATED APPLICATION

This application claims priority from Korean Patent Application No. 10-2019-0160767 filed on Dec. 5, 2019, the contents of which in their entirety are herein incorporated by reference.

BACKGROUND

1. Technical Field

The present disclosure relates to a lamp for a vehicle, and more specifically, to a lamp for a vehicle that allows a nearby vehicle or a pedestrian to easily recognize a driving state of the vehicle.

2. Description of the Related Art

Generally, a vehicle is equipped with various lamps having an illumination function for easily confirming an object positioned in the vicinity of the vehicle at low light conditions (e.g., nighttime driving), and a signaling function for informing a surrounding vehicle or pedestrians of a driving state of the vehicle.

For example, the main purpose of head lamps and fog lamps is the illumination function, and the main purpose of position lamps, daytime running lamps, turn signal lamps, backup lamps, brake lamps, or the like is the signaling function. Each lamp is stipulated by laws and regulations for their installation standards and specifications so that each function may be fully utilized.

When the lamps described above are respectively provided in the vehicle, a space for installation of each lamp is required, so research has been actively conducted to enable one lamp to perform multiple functions to avoid deteriorating space utilization.

In general, when a plurality of functions are performed with one lamp, while one of the plurality of functions is performed, the remaining functions are not performed. Therefore, in a situation where two or more functions are required to be performed at the same time, there are cases in which it is not possible to properly cope with the two or more functions.

Therefore, in the case of performing a plurality of functions with one lamp, there is a need for means such that one of a plurality of functions is performed alone or two or more functions are simultaneously performed depending on operating status of the vehicle.

SUMMARY

Aspects of the present disclosure provide a lamp for a vehicle that may be implemented to generate the light in different light emitting modes, and thereby any one of a plurality of functions may be performed alone or two or more functions may be performed simultaneously depending on operating status of the vehicle.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a lamp unit including a plurality of light emitting areas arranged in a direction; a mode determination unit configured to determine a selected light emitting mode among a plurality of light emitting modes of the lamp unit; and a control unit configured to cause at least one of the plurality of light emitting areas to generate light having a first color or a second color based on the determined light emitting mode. In particular, the plurality of light emitting modes may include a first light emitting mode in which the light of the first color is generated from the plurality of light emitting areas; and a second light emitting mode in which the light generated from each of the plurality of light emitting areas is changed from the first color to the second color sequentially from a first side to a second side along the arrangement direction of the plurality of light emitting areas.

The mode determination unit may be configured to determine that the second light emitting mode is selected in response to a turn signal being input during the first light emitting mode. In the first light emitting mode, a brightness of the light generated from the plurality of light emitting areas may be varied based on a function of the lamp unit.

In the second light emitting mode, the control unit may be configured to cause the plurality of light emitting areas to sequentially turn off the light of the first color, and to sequentially turn on the light of the second color.

Further, the control unit may be configured to cause the lamp unit to operate in the second light emitting mode based on an operation signal that includes a turn-on period and a turn-off period repeated with a predetermined period. In the second light emitting mode, during a first time segment of the turn-on period, the light of the first color may be turned off and the light of the second color may be turned on sequentially from the plurality of light emitting areas. During a second time segment of the turn-on period, which follows the first time segment, the light of the second color may be generated from the plurality of light emitting areas. During the turn-off period, the light of the first color may be generated from the plurality of light emitting areas.

The plurality of light emitting modes may further comprise a third light emitting mode in which the light of the second color is sequentially generated from the plurality of light emitting areas, and the control unit may be configured to simultaneously turn off the plurality of light emitting areas in which the light in accordance with the first light emitting mode is generated, and to subsequently operate the plurality of light emitting areas in the third light emitting mode. The mode determination unit may be configured to determine that the third light emitting mode is selected in response to a turn signal being input during the first light emitting mode.

In the first light emitting mode, either one of the second light emitting mode or the third light emitting mode may be selected based on a brightness of the light generated from the plurality of light emitting areas.

The lamp unit may comprise a plurality of light emitting units that form each of the plurality of light emitting areas. Each of the plurality of light emitting units may include a first light source to generate the light of the first color; and a second light source to generate the light of the second color.

Further, in response to the second light emitting mode being selected, the first light source of the first color may be sequentially turned off, and the second light source of the second color may be sequentially turned on. A time point when the first light source of the first color is turned off may correspond to a time point when the second light source of the second color is turned on.

In response to the second light emitting mode being selected, the first light source of the first color may be sequentially turned off, and the second light source of the second color may be sequentially turned on. Either one of a time point when the first light source of the first color is turned off and a time point when the second light source of the second color is turned on may be earlier than the other. A delay time between the time point when the first light source of the first color is turned off and the time point when the second light source of the second color is turned on may be equal to or less than about 100 ms.

A failure detection unit may be further provided to detect a failure of the lamp unit. In response to detecting the failure of the lamp unit while a turn signal is input, the control unit may be configured to cause the plurality of light emitting areas to generate the light with one of the first color or the second color in unison. In response to detecting the failure of the lamp unit, the control unit may be configured to cause the plurality of light emitting areas to alternately generate the light of the first color in unison and the light of the second color in unison. In response to detecting the failure of the lamp unit, the control unit may be configured to cause the plurality of the light emitting areas to generate the light of the first color in unison.

For example, the first color may be white, which is for a function of a position lamp or a daytime running lamp, and the second color may be yellow, which is for a function of a turn signal lamp.

According to another aspect of the present disclosure, a method of operating a lamp for vehicle comprising a plurality of light emitting areas each configured to generate light having a first color or a second color is provided. The method may include generating the light of the first color in each of the plurality of light emitting areas; during a first time segment of a turn-on period, changing the light in each of the plurality of light emitting areas from the first color to the second color sequentially from a first side to a second side along an arrangement direction of the plurality of light emitting areas; during a second time segment of the turn-on period, which follows the first time segment of the turn-on period, generating the light of the second color in each of the plurality of light emitting areas; and changing the light in each of the plurality of light emitting areas from the second color to the first color simultaneously and sustaining the light of the first color during a turn-off period. The first time segment of the turn-on period may be initiated in response to a turn signal being input, and thereafter, the first time segment of the turn-on period, the second time segment of the turn-on period, and the turn-off period may be repeated.

The method may further include, in response to detecting a failure of the lamp while the turn signal is input, alternately generating the light of the second color in unison during the turn-on period and the light of the first color in unison during the turn-off period from the plurality of light emitting areas. Alternatively, in response to detecting a failure of the lamp while the turn signal is input, the light with one of the first color or the second color may be generated in unison from the plurality of light emitting areas until the failure is resolved. In particular, in response to detecting a failure of the lamp while the turn signal is input, the light of the first color may be generated in unison from the plurality of light emitting areas until the failure is resolved.

A lamp for a vehicle according to the present disclosure has one or more of the following benefits. It may be implemented to generate the light in different light emitting modes, such that any one of a plurality of functions is performed alone or two or more functions are performed simultaneously depending on operation status of the vehicle. Therefore, it is possible to implement more various functions. In addition, compared to the case of having each lamp for each function, the installation space may be reduced, and thus space utilization may be improved. The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
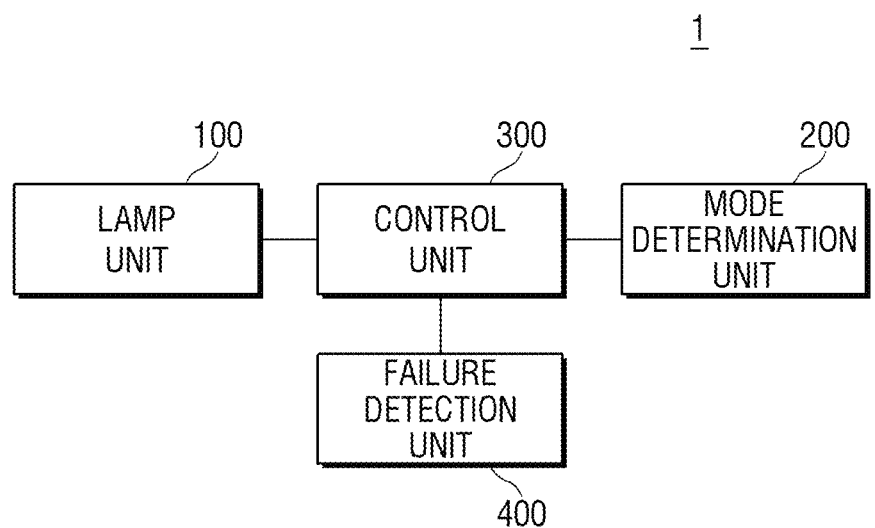
FIG. 1 is a block diagram showing the configuration of a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a lamp for a vehicle according to exemplary embodiments of the present disclosure.

FIG. 1 is a block diagram showing the configuration of a lamp for a vehicle according to an exemplary embodiment of the present disclosure. Referring to FIG. 1, a lamp 1 for a vehicle according to an exemplary embodiment of the present disclosure may include a lamp unit 100, a mode determination unit 200, and a control unit 300.

In the exemplary embodiment of the present disclosure, the lamp 1 for the vehicle may be used as a function such as a position lamp, a daytime running lamp, a turn signal lamp, or the like that may inform a surrounding vehicle or a pedestrian of a driving state of the vehicle. The lamp 1 for the vehicle of the present disclosure may be used for one of the functions described above or may be used together for two or more functions. In the exemplary embodiment of the present disclosure, an example will be described in which the lamp 1 for the vehicle is used for two or more functions, such as a position lamp and a turn signal lamp, or a daytime running lamp and a turn signal lamp.

The lamp unit 100 may generate light that is suitable for the functions of the lamp 1 for the vehicle of the present disclosure. A color, a brightness, an emission region, or the like of the light generated by the lamp unit 100 may be varied depending on the functions of the lamp 1 for the vehicle of the present disclosure.

Figure 2:
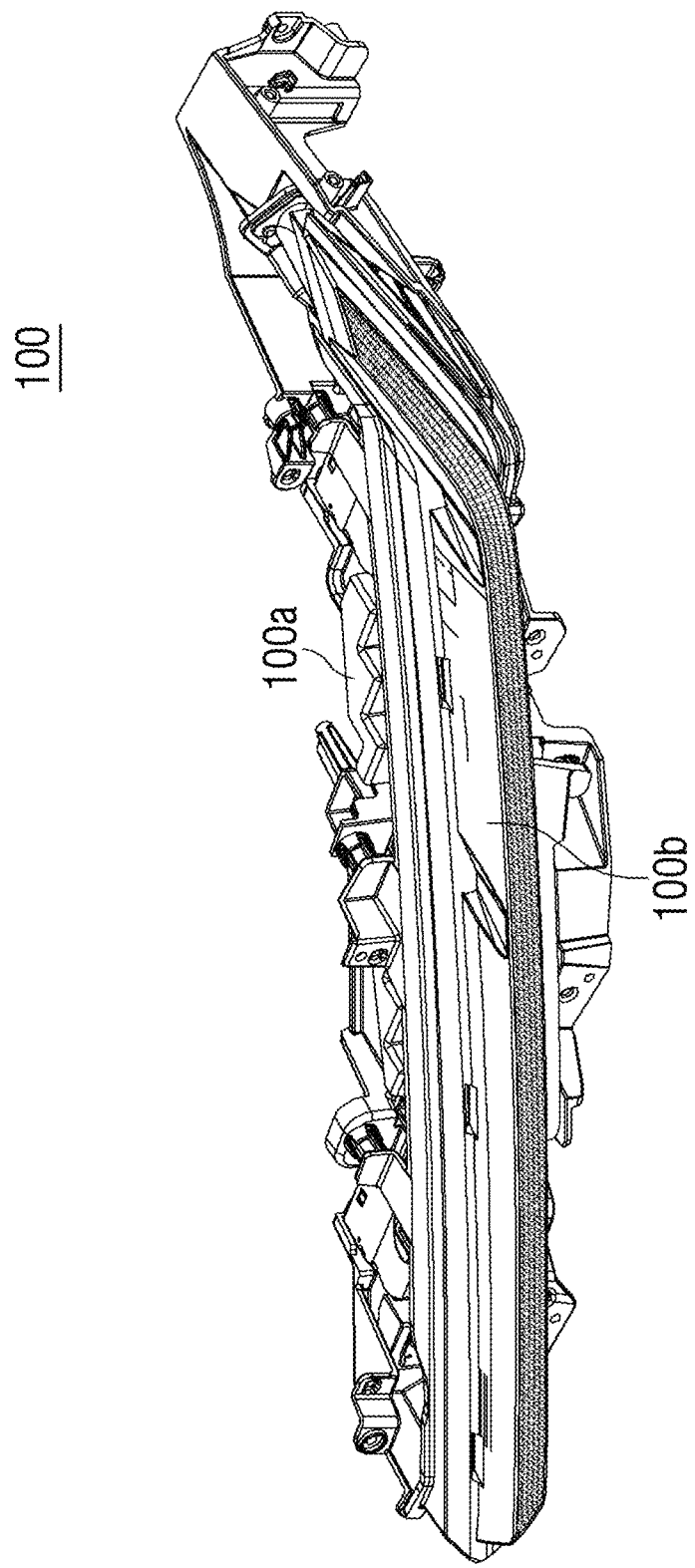
FIG. 2 is a perspective view showing a lamp unit according to the exemplary embodiment of the present disclosure.
Figure 3:
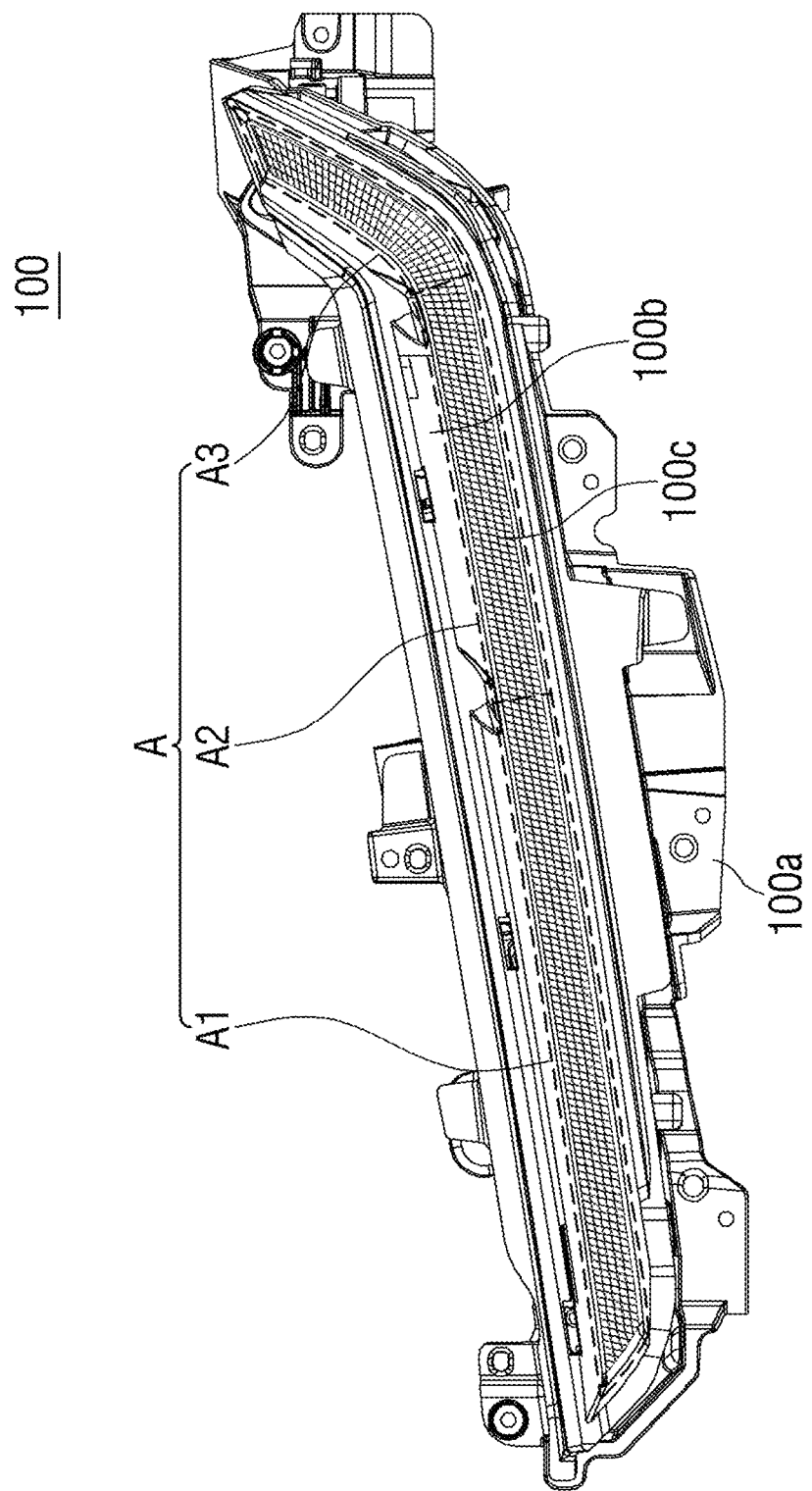
FIG. 3 is a front view showing the lamp unit according to the exemplary embodiment of the present disclosure.
Figure 4:
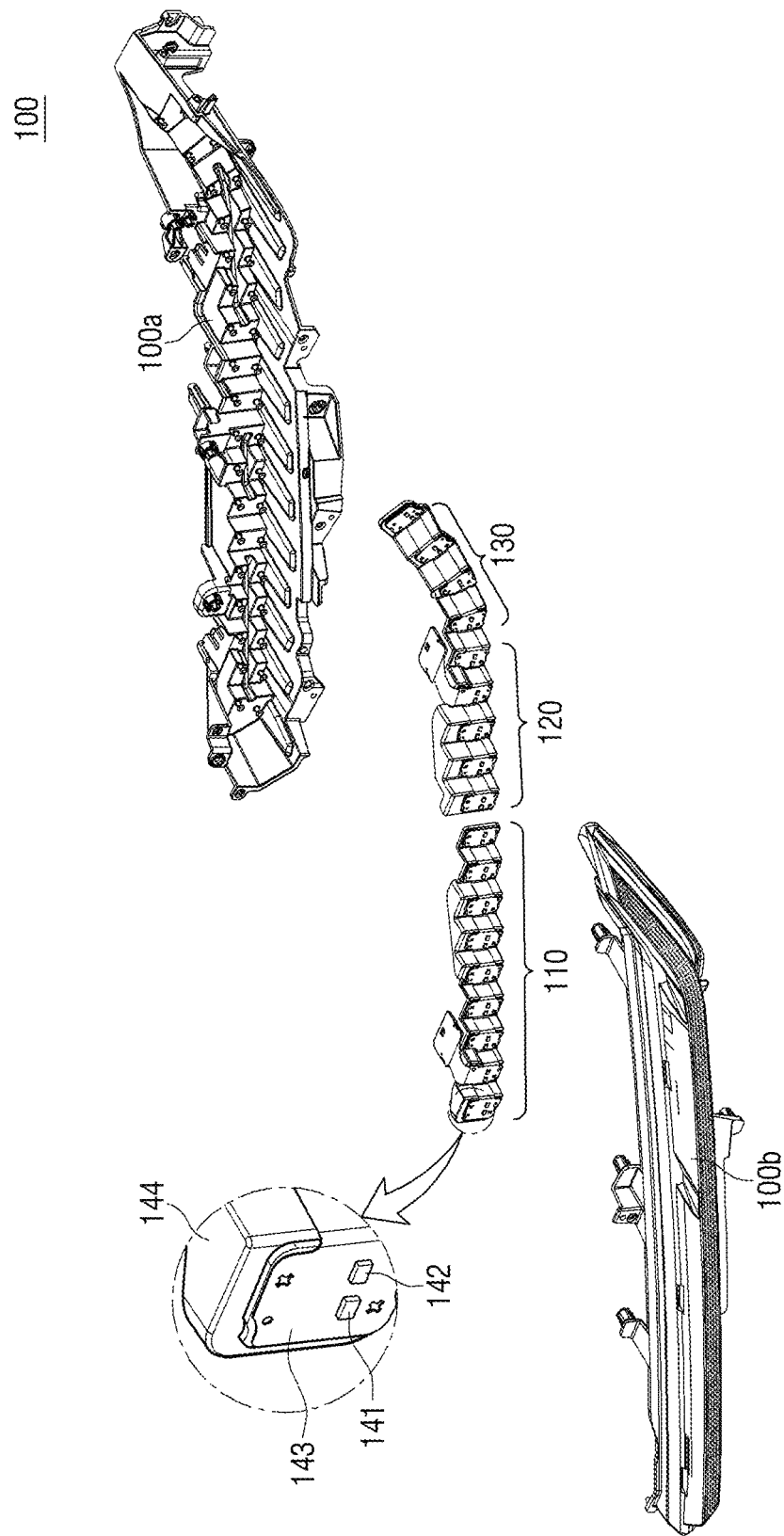
FIG. 4 is an exploded perspective view showing the lamp unit according to the exemplary embodiment of the present disclosure.

FIG. 2 is a perspective view showing the lamp unit according to the exemplary embodiment of the present disclosure. FIG. 3 is a front view showing the lamp unit according to the exemplary embodiment of the present disclosure. FIG. 4 is an exploded perspective view showing the lamp unit according to the exemplary embodiment of the present disclosure.

Referring to FIGS. 2 to 4, the lamp unit 100 according to the exemplary embodiment of the present disclosure may include a plurality of light emitting units 110, 120, and 130 arranged in a direction. The plurality of light emitting units 110, 120, and 130 may be accommodated in a space formed by a lamp housing 100a and a lens unit 100b coupled to the lamp housing 100a, and at least one of the plurality of light emitting units 110, 120, and 130 may generate light based on a required lighting image.

In the exemplary embodiment of the present disclosure, the plurality of light emitting units 110, 120, and 130 may be arranged in a left-right direction, that is, a vehicle width direction or a lateral direction. The plurality of light emitting units 110, 120, and 130 will be referred to as a first light emitting unit 110, a second light emitting unit 120, and a third light emitting unit 130, respectively, in a direction from the inboard to the outboard of the vehicle.

The light emitting area A of the lamp unit 100 may correspond to an area in which an emission surface 100c of the lens unit 100b through which the light is emitted from the lamp unit 100 is formed, and may include a plurality of light emitting areas A1, A2, and A3 formed by each of the plurality of light emitting units 110, 120, and 130. Hereinafter, in the exemplary embodiment of the present disclosure, the plurality of light emitting areas A1, A2, and A3 formed by the first to third light emitting units 110, 120, and 130, respectively, will be referred to as a first light emitting area A1, a second light emitting area A2, and a third light emitting area A3.

In the exemplary embodiment of the present disclosure, the plurality of light emitting units 110, 120, and 130 may be formed in three to form three light emitting areas. However, the present disclosure is not limited thereto, and the number of light emitting units may be varied depending on a layout of the lamp unit 100 or on design perspectives.

Each of the plurality of light emitting units 110, 120, and 130 may include at least one first light source 141 for generating light of a first color and at least one second light source 142 for generating light of a second color. Here, the number or position of the light sources included in each light emitting unit may vary depending on a size or shape of a light emitting area formed by each light emitting unit.

In the exemplary embodiment of the present disclosure, in each of the plurality of light emitting units 110, 120, 130, the first light source 141 of the first color and the second light source 142 of the second color may form one light source group, and each light source group may be installed on a substrate 143 mounted on a support 144 such as a heat sink.

In addition, in the exemplary embodiment of the present disclosure, an example will be described in which the number of light source groups included in each of the first to third light emitting units 110, 120, and 130 decreases from the first light emitting unit 110 to the third light emitting unit 130. However, the present disclosure is not limited thereto, and the number of light source groups included in each of the first to third light emitting units 110, 120, and 130 may vary depending on a size or shape of each of the first to third light emitting areas A1, A2, and A3.

In the exemplary embodiment of the present disclosure, each of the plurality of light emitting units 110, 120, and 130 may include the first light source 141 of the first color and the second light source 142 of the second color, and thus to the two light sources 141 and 142 may be used together for the functions described above. Here, the plurality of light emitting units 110, 120, and 130 may generate at least one of the first color or the second color based on the function of the lamp 1 for the vehicle of the present disclosure.

In the exemplary embodiment of the present disclosure, the first color may be white, which is suitable for a function of a position lamp or a daytime running lamp, and the second color may be yellow, which is suitable for a function of a turn signal lamp. However, the present disclosure is not limited thereto, and the first color and the second color may be variously changed based on the function of the lamp 1 for the vehicle of the present disclosure.

The lamp unit 100 may be operated in any one of a plurality of light emitting modes. Here, light having the first color or the second color may be generated from at least one of the plurality of light emitting units 110, 120, and 130 in accordance with each light emitting mode.

In the exemplary embodiment of the present disclosure, the plurality of light emitting modes may include, for example, a first light emitting mode, a second light emitting mode, and a third light emitting mode. In the first light emitting mode, light with the first color may be collectively generated from the plurality of light emitting units 110, 120, and 130. In the second light emitting mode, which may follow the first light emitting mode, light generated from each of the plurality of light emitting units 110, 120, and 130 may be sequentially changed from the first color to the second color. In the third light emitting mode, the light corresponding to the first light emitting mode may be turned off from the plurality of light emitting units 110, 120, and 130 in unison, and light with the second color may be generated sequentially from each of the plurality of light emitting units 110, 120, and 130 along the arrangement direction thereof.

In particular, the first light emitting mode may be for a function of a position lamp or a function of a daytime running lamp, and the second light emitting mode and the third light emitting mode may be for a function of a turn signal lamp. The first to third light emitting modes are described in detail as follows.

As described above, the first light emitting mode may be used as a position lamp function or a daytime running lamp function, and the light of the first color may be collectively generated from the plurality of light emitting units 110, 120, and 130.

In the first light emitting mode, the brightness of the light generated from the plurality of light emitting units 110, 120, and 130 may be varied based on the function of the lamp 1 for the vehicle of the present disclosure. For example, compared to the case where the lamp 1 for the vehicle of the present disclosure is used for a function of a position lamp, in the case where it is used for a function of a daytime running lamp, the brightness of the light generated from the plurality of light emitting units 110, 120, and 130 may be greater. This is to ensure visibility of the daytime running lamp, since the daytime running lamp is typically used during the daytime when it is more difficult to ensure visibility, whereas the position lamp is typically used during the nighttime.

The second light emitting mode and the third light emitting mode may be used for when a turn signal is input by a driver or a sensor installed in a vehicle while the lamp unit 100 is in the first light emitting mode. The second light emitting mode and the third light emitting mode may be determined based on the function of the lamp 1 for the vehicle of the present disclosure. In other words, since the position lamp may mainly serve to inform the presence of the vehicle and the width thereof at night or in low light conditions, it needs to be illuminated constantly or substantially constantly. The daytime running lamp may be mainly used for allowing the vehicle to be more easily recognized when the weather is cloudy or foggy during the daytime, and it may be not required to be constantly illuminated, unlike the position lamp. Therefore, different light emitting modes may be used for the position lamp and the daytime running lamp.

The second light emitting mode may be used when a turn signal is input while the lamp 1 for the vehicle of the present disclosure is being used as a function of a position lamp. The second light emitting mode may be understood as a mode in which a function of a position lamp and a function of a turn signal lamp are simultaneously performed in response to the turn signal being input. In other words, in the second light emitting mode, when the turn signal is input while the lamp unit 100 is operating in the first light emitting mode and the light of the first color is collectively generated from the plurality of light emitting units 110, 120, and 130 in unison, the light generated from each of the plurality of light emitting units 110, 120, and 130 may be changed from the first color to the second color sequentially from a first side to a second side along the arrangement direction of the plurality of light emitting units 110, 120, and 130.

For example, in the second light emitting mode, when the turn signal is input while white light is generated from the first to third light emitting units 110, 120, and 130 in unison in accordance with the first light emitting mode, yellow light may be generated in the order of the first light emitting part 110, the second light emitting part 120, and the third light emitting part 130, such that as a whole, the white light is sequentially turned off, and the yellow light is sequentially turned on. As such, the position lamp function and the turn signal lamp function may be performed simultaneously.

In particular, the first light emitting area A1 of a light emitting unit that generates the yellow light first among the first to third light emitting units 110, 120, and 130 may have an area of at least 24 $cm^2$. This is to allow nearby vehicles or pedestrians to easily recognize that the function of the turn signal lamp is being performed. In other words, it may be understood that when the light of a predetermined color is sequentially generated from the first to third light emitting units 110, 120, and 130, a light emitting area formed by the light emitting unit that first generates the light may have an area of at least 24 $cm^2$.

The third light emitting mode may be used when a turn signal is input while the lamp 1 for the vehicle of the present disclosure is being used as a function of a daytime running lamp. Accordingly, in the third light emitting mode, the lamp 1 for the vehicle may be used for a function of a turn signal lamp instead of the daytime running lamp in response to the turn signal being input. In other words, in the third light emitting mode, when the turn signal is input while the lamp unit 100 is operating in the first light emitting mode and the light of the first color is collectively generated from the plurality of light emitting units 110, 120, and 130, after the light of the first color is turned off simultaneously, light of the second color may be generated sequentially from each of the plurality of light emitting units 110, 120, and 130 from the first side to the second side along the arrangement direction thereof.

For example, in the third light emitting mode, when the turn signal is input in a state in which the white light is generated from the first to third light emitting units 110, 120, and 130 in accordance with the first light emitting mode, after the first to third light emitting units 110, 120, and 130 are turned off simultaneously, the yellow light may be generated in the order of the first light emitting unit 110, the second light emitting unit 120, and the third light emitting unit 130, to allow the function of the turn signal lamp to be performed.

Further, the mode determination unit 200 may determine the light emitting mode of the lamp unit 100 and transmit the information regarding the determined light emitting mode to the control unit 300. For example, when an operation signal of the position lamp or daytime running lamp is input, the mode determination unit 200 may determine it as the first light emitting mode. In addition, when a turn signal is input in the first light emitting mode, the mode determination unit 200 may determine whether to transmit the information corresponding to the second light emitting mode or to the third light emitting mode. In particular, the second light emitting mode and the third light emitting mode may be determined based on for which function the lamp 1 for the vehicle of the present disclosure is being used in the first light emitting mode. The control unit 300 may be configured to control an operation of the plurality of light emitting units 110, 120, and 130 based on the light emitting mode determined by the mode determination unit 200.

Figure 5:
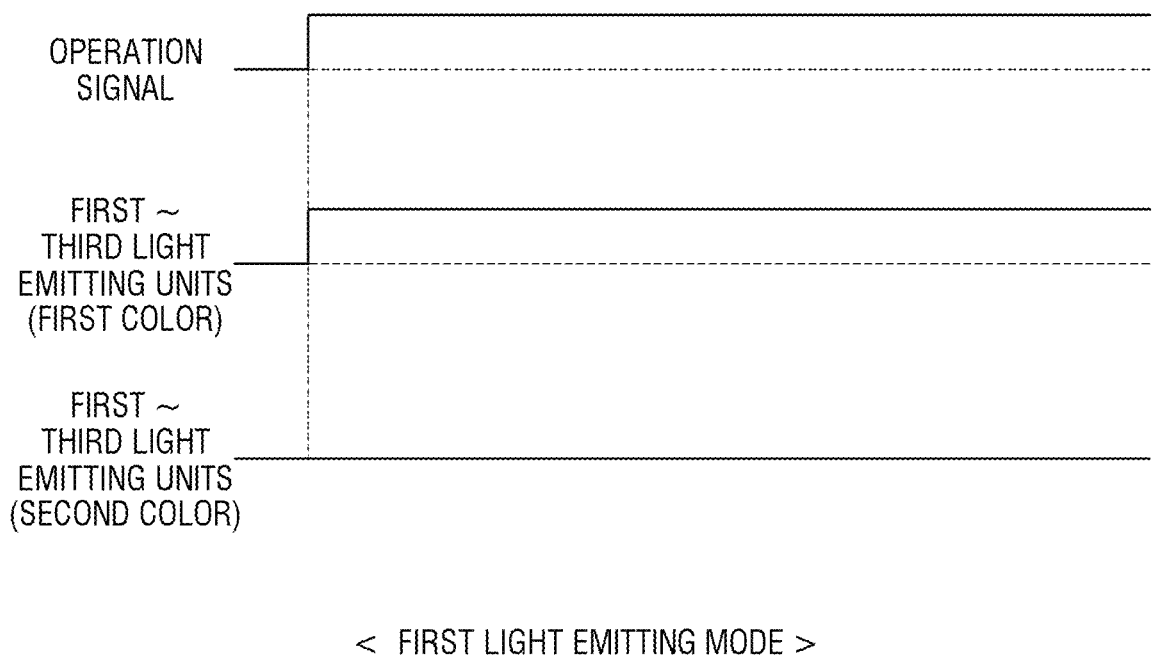
FIG. 5 is a graph showing a timing chart of a first light emitting mode according to the exemplary embodiment of the present disclosure.
Figure 6:
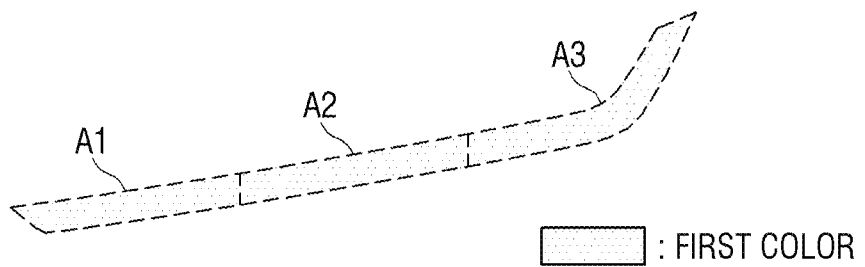
FIG. 6 is a schematic diagram showing an operation process of the first light emitting mode according to the exemplary embodiment of the present disclosure.

FIG. 5 is a graph showing a timing chart of the first light emitting mode according to the exemplary embodiment of the present disclosure. Referring to FIG. 5, when an operation signal of the position lamp or daytime running lamp is input, the control unit 300 according to the exemplary embodiment of the present disclosure may be configured to turn on the light source of the first color included in each of the first to third light emitting units 110, 120, and 130 in the first light emitting mode, and turn off the light source of the second color, thereby enabling the light of the first color to be generated in the first to third light emitting areas A1, A2, and A3 in unison as shown in FIG. 6.

Figure 7:
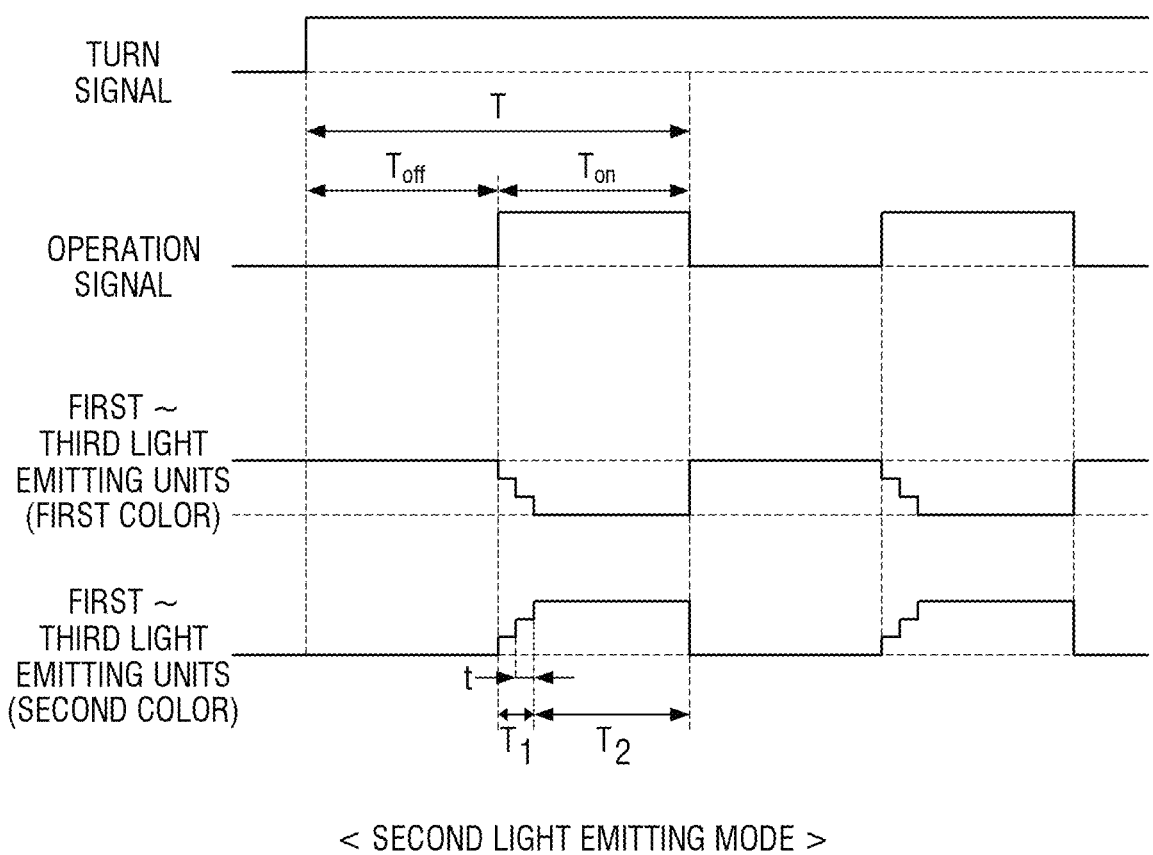
FIG. 7 is a graph showing a timing chart of a second light emitting mode according to the exemplary embodiment of the present disclosure.

FIG. 7 is a graph showing a timing chart of the second light emitting mode according to the exemplary embodiment of the present disclosure. Referring to FIG. 7, in response to a turn signal being input during the first light emitting mode operating as the position lamp function, the control unit 300 according to the exemplary embodiment of the present disclosure may be configured to cause the light of the first color to be sequentially turned off and the light of the second color to be sequentially turned on going from a first side to a second side in the arrangement direction based on the operation signal. The operation signal may include a turn-on period $T_{on}$ and a turn-off period $T_{off}$ which are repeated with a predetermined period T. Accordingly, the functions of the position lamp and turn signal lamp may be performed simultaneously.

Figure 8:
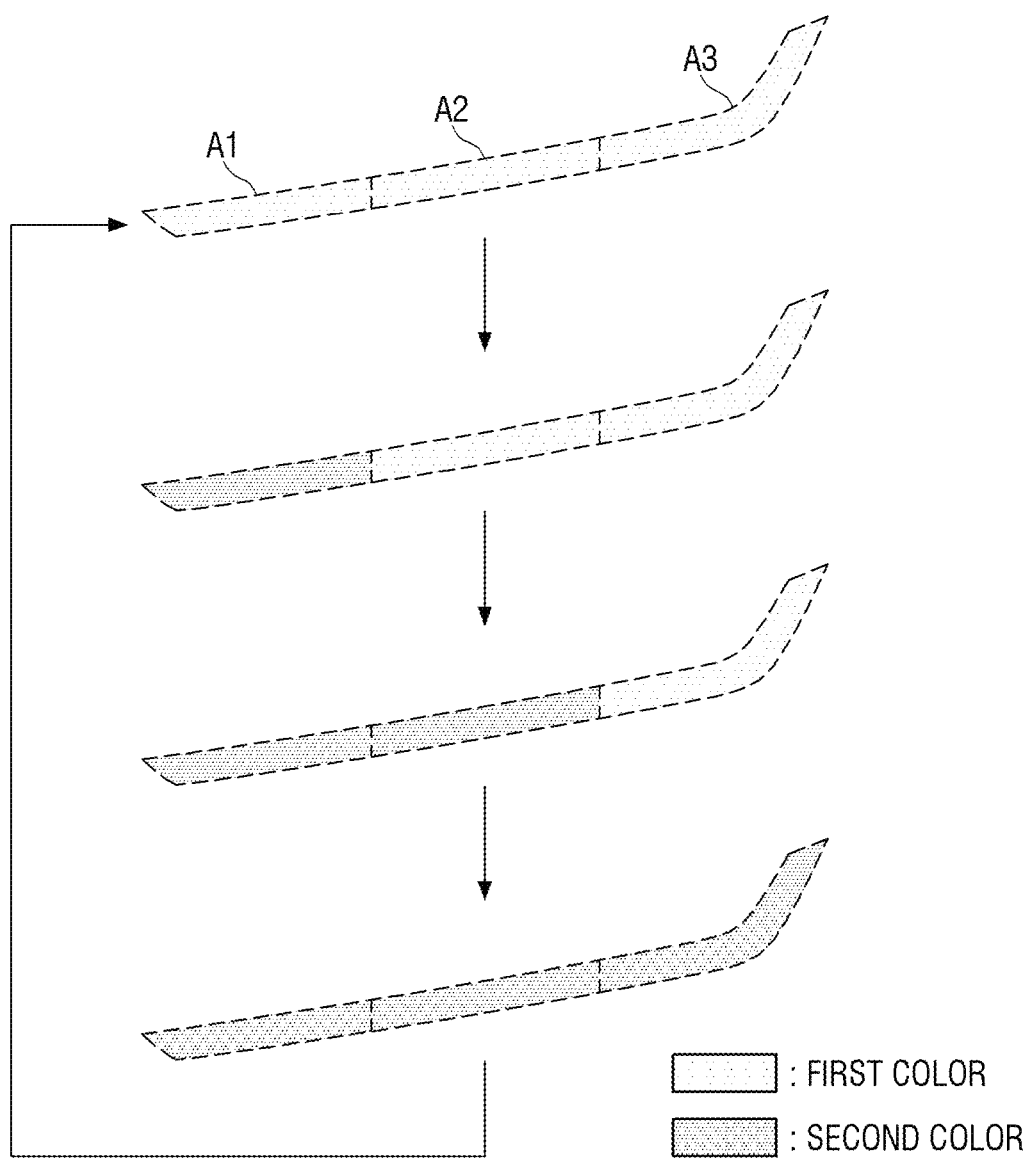
FIG. 8 is a schematic diagram showing an operation process of the second light emitting mode according to the exemplary embodiment of the present disclosure.

In other words, in the second light emitting mode, in a state in which the light of the first color is generated from the first to third light emitting areas A1, A2, and A3 as shown in FIG. 8, the light of the first color may be sequentially turned off from the first light emitting area A1 to the third light emitting area A3, and the light of the second color may be sequentially turned on.

In addition, in the second light emitting mode, the light generated from the first to third light emitting units 110, 120, and 130 may be sequentially changed from the first color to the second color at a predetermined time interval t during the first time segment $T_1$ of the turn-on period $T_{on}$, and after the first time segment $T_1$, the second color may be maintained for the second time segment $T_2$. Subsequently, the light of the first color may be generated from the first to third light emitting units 110, 120, and 130 during the turn-off period $T_{off}$. Accordingly, the functions of the position lamp and the turn signal lamp may be performed simultaneously.

In the second light emitting mode, for each of the first to third light emitting units 110, 120, and 130, a time point of turning off the light of the first color and a time point of turning on the light of the second color may or may not correspond to each other. When the time point of turning off the light having the first color and the time point of turning on the light having the second color are different from each other, either one of the time point of turning off the light having the first color and the time point of turning on the light having the second color may be earlier than the other, and a delay time between the two time points may be greater than 0 and equal to or less than about 100 ms. It may be understood that the delay time between the time point of turning off the light having the first color and the time point of turning on the light having the second color corresponds to a time period during which a surrounding vehicle or a pedestrian may recognize the change of color and during which a lighting image may be smoothly transitioned.

Figure 9:
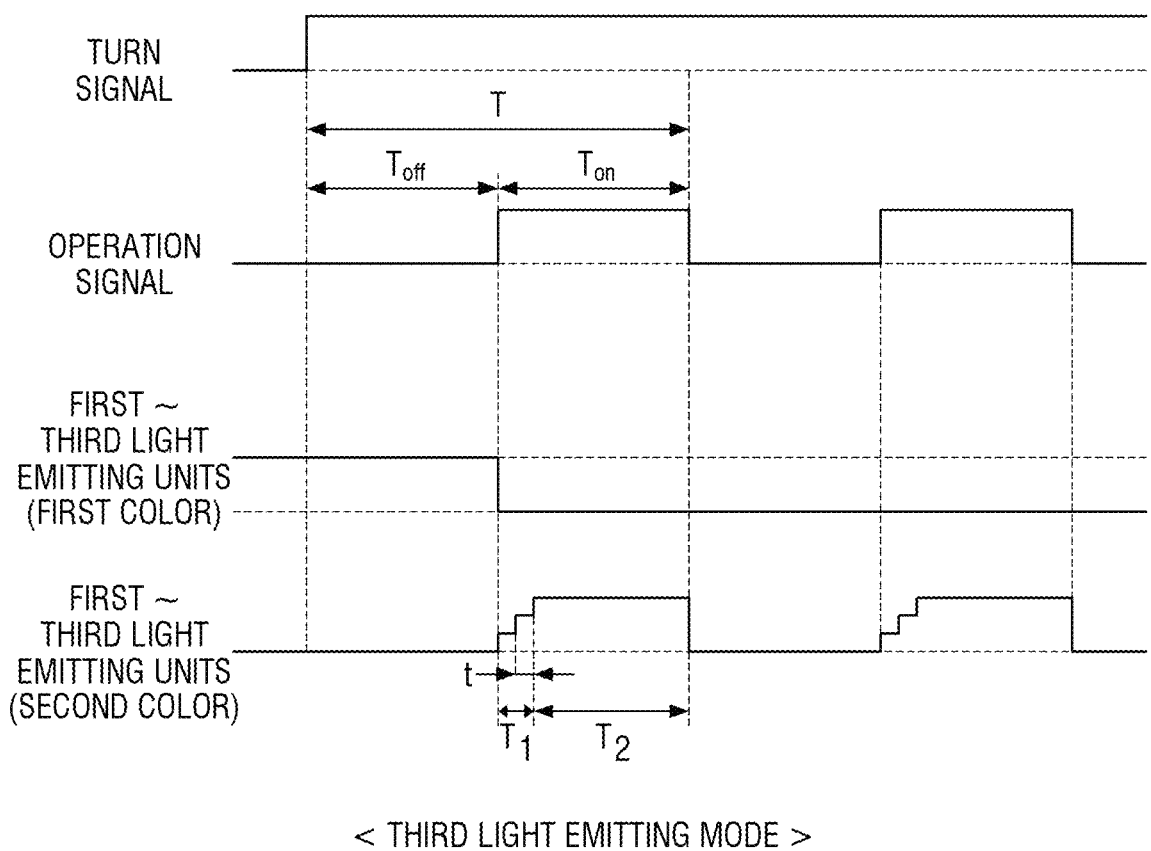
FIG. 9 is a graph showing a timing chart of a third light emitting mode according to the exemplary embodiment of the present disclosure.

FIG. 9 is a graph showing a timing chart of the third light emitting mode according to the exemplary embodiment of the present disclosure. Referring to FIG. 9, in response to a turn signal being input during the first light emitting mode operating as the daytime running lamp, the control unit 300 according to the exemplary embodiment of the present disclosure may be configured to turn off the first to third light emitting units 110, 120, and 130 simultaneously, and subsequently, to cause the first to third light emitting units 110, 120, and 130 to be sequentially turned on such that the light of the second color is generated from the first side to the second side along the arrangement direction based on the operation signal. The operation signal may include the turn-on period $T_{on}$ and the turn-off period $T_{off}$ that are repeated with a predetermined period T. Accordingly, the function of the turn signal lamp may be performed instead of the daytime running lamp.

Figure 10:
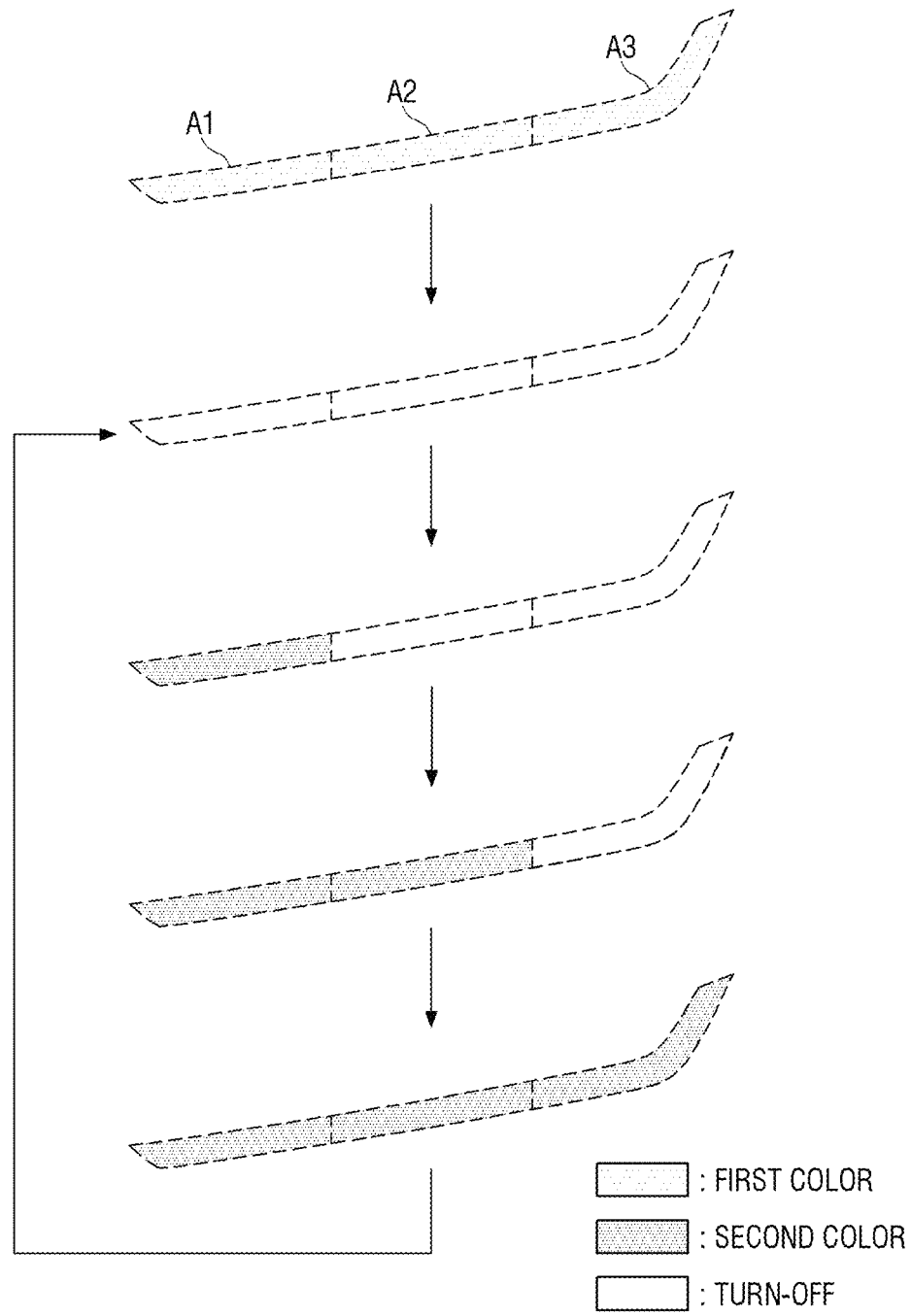
FIG. 10 is a schematic diagram showing an operation process of the third light emitting mode according to the exemplary embodiment of the present disclosure.

In other words, in the third light emitting mode, in a state in which the light of the first color is generated from the first to third light emitting areas A1, A2, and A3 as shown in FIG. 10, when the turn signal is input, the light of the first color may be turned off together, and subsequently, the light of the second color may be sequentially turned on from the first light emitting area A1 to the third light emitting area A3.

In addition, in the third light emitting mode, similar to the second light emitting mode as described above, during the turn-on period $T_{on}$, the light of the second color may be sequentially generated from the first to third light emitting units 110, 120, and 130 at a predetermined time interval t during the first time segment $T_1$. After the first time segment $T_1$, the second color may be maintained for the second time segment $T_2$. Subsequently, during the turn-off period $T_{off}$, the first to third light emitting units 110, 120, and 130 may be turned off together.

When the first to third light emitting units 110, 120, can 130 cannot be turned on or off in sequence due to a failure of a light source or a control circuit, the control unit 300 may be configured to operate the lamp unit 100 in a light emitting mode different from the first to third light emitting modes described above (e.g., a fourth light emitting mode). For example, the lamp 1 for the vehicle of the present disclosure may further include a failure detection unit 400 for detecting a failure of the lamp unit 100 due to various causes such as described above.

In the exemplary embodiment of the present disclosure, the sequential illumination of the first to third light emitting units 110, 120, and 130 may be used for the turn signal lamp.

Therefore, an example will be presented in which the failure detection unit 400 detects a light source failure or a control circuit malfunction for an operation of the turn signal lamp based on an electric current or a voltage.

Figure 11:
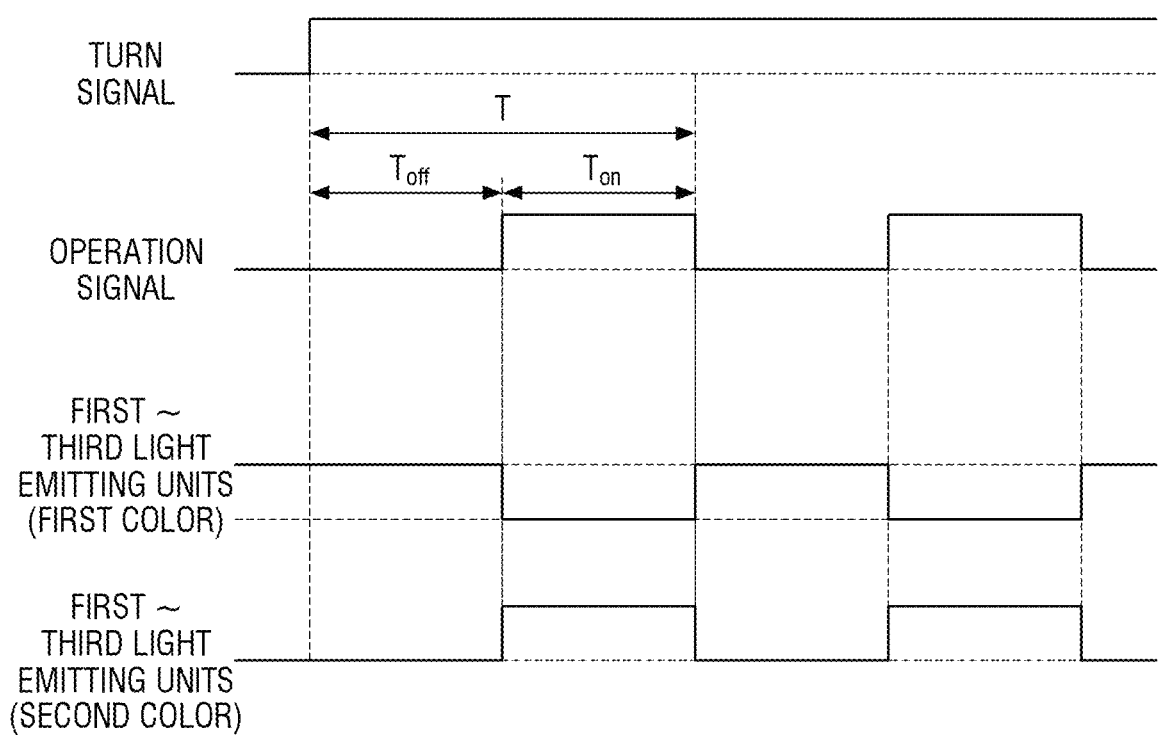
FIG. 11 is a graph showing a timing chart of a fourth light emitting mode according to the exemplary embodiment of the present disclosure.
Figure 12:
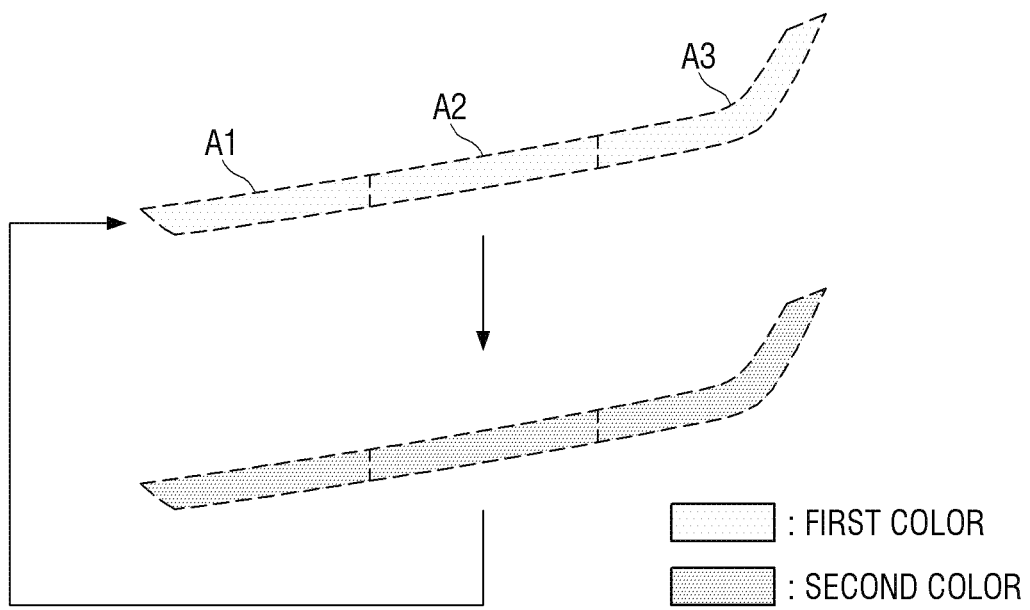
FIG. 12 is a schematic diagram showing an operation process of the fourth light emitting mode according to the exemplary embodiment of the present disclosure.

When a failure signal is transmitted from the failure detection unit 400, the control unit 300 may be configured to determine that normal sequential turn-off or sequential turn-on is unavailable, and may be configured to cause light having at least one of the first color or the second color to be generated in unison from the first to third light emitting units 110, 120, and 130. When a failure signal is transmitted from the failure detection unit 400, as the fourth light emitting mode, the control unit 300 may be configured to cause the first to third light emitting units 110, 120, and 130 to alternately generate the light of the first color and the light of the second color based on the turn-on period $T_{on}$ and the turn-off period $T_{off}$ of the operation signal as shown in FIGS. 11 and 12.

In other words, in a situation where the first to third light emitting units 110, 120, and 130 are unable to be sequentially turned on, the control unit 300 may be configured to cause the light of the first color and the light of the second color to be alternately generated based on the operation signal. Therefore, the occurrence of a vehicle accident may be prevented due to the notifying nearby vehicles or pedestrians of a turn direction of the vehicle while allowing a failure to be recognized. In the foregoing description, FIGS. 11 and 12 were described as an example in which the lamp unit 100 is operated in the fourth light emitting mode in response to the occurrence of a failure. However, the present disclosure is not limited thereto, and the fourth light emitting mode may be selected by a driver.

Figure 13:
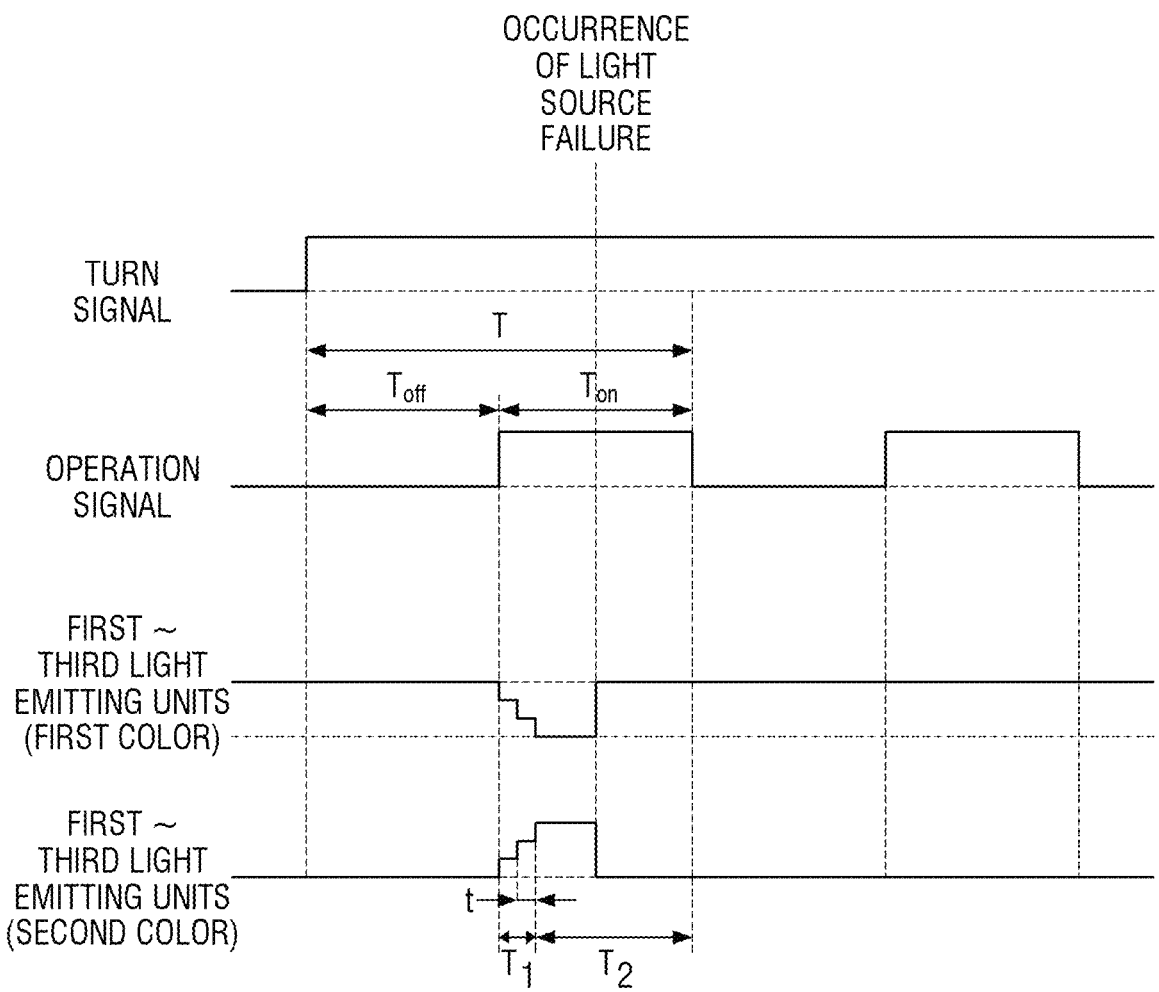
FIG. 13 is a graph showing a timing chart of a fifth light emitting mode according to the exemplary embodiment of the present disclosure.
Figure 14:
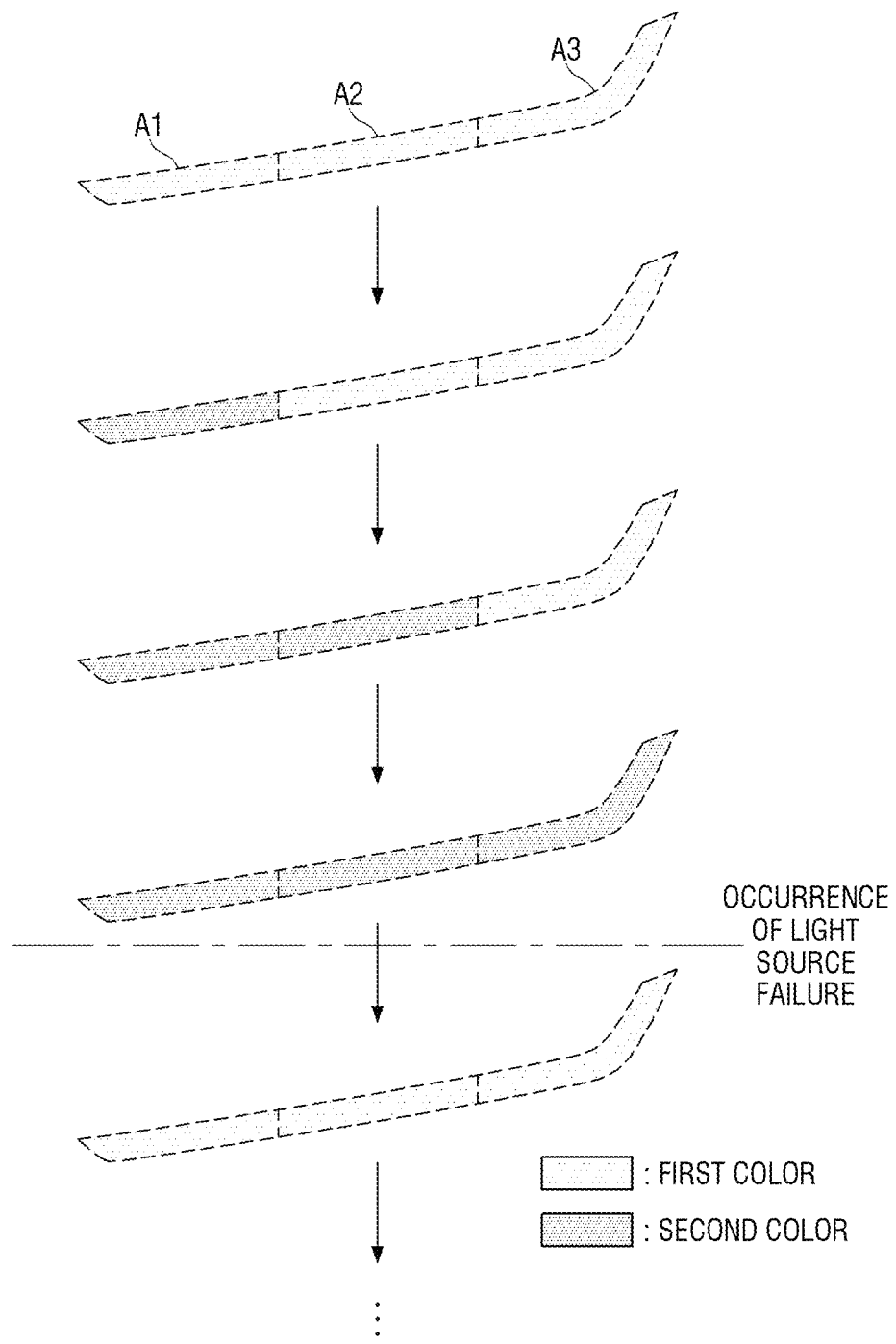
FIG. 14 is a schematic diagram showing an operation process of the fifth light emitting mode according to the exemplary embodiment of the present disclosure.

In addition, when a failure signal is transmitted from the failure detection unit 400, if a failure occurs in a light source of the second color included in at least one of the first to third light emitting units 110, 120, and 130 as shown in FIGS. 13 and 14, the control unit 300 may be configured to cause the first to third light emitting units 110, 120, and 130 to generate the light of the first color in unison from a time point when the light source failure is detected until the failure is resolved (e.g., a fifth light emitting mode).

In FIGS. 13 and 14, an example is described in which when a failure of the light source occurs, the light of the first color is generated in unison from the first to third light emitting units 110, 120 and 130 until the failure is resolved. However, the present disclosure is not limited thereto, and even when the light source failure occurs, it may be operated in the fourth light emitting mode described above.

As described above, according to the lamp 1 for the vehicle of the present disclosure, since it may be used for two or more functions, vehicle accidents may be presented due to the different light emitting modes enabled depending on whether the light is required to be constantly on or not.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle, comprising:
   a lamp unit including a plurality of light emitting areas arranged in a direction;
   a mode determination unit configured to determine a selected light emitting mode among a plurality of light emitting modes of the lamp unit; and
   a control unit configured to cause at least one of the plurality of light emitting areas to generate light having a first color or a second color based on the determined light emitting mode,
   wherein the plurality of light emitting modes comprises:
      a first light emitting mode in which the light of the first color is generated from the plurality of light emitting areas;
      a second light emitting mode in which the light generated from each of the plurality of light emitting areas is changed from the first color to the second color sequentially from a first side to a second side along the arrangement direction of the plurality of light emitting areas; and
      a third light emitting mode in which after the light of the first color is turned off simultaneously the light of the second color is sequentially generated from the plurality of light emitting areas from the first side to the second side, and
   wherein the first light emitting mode is changed to either one of the second light emitting mode or the third light emitting mode, wherein the second light emitting mode or the third light emitting mode is selected based on a brightness of the light generated from the plurality of light emitting areas during the first light emitting mode.

2. The lamp of claim 1, wherein the mode determination unit is configured to determine that the second light emitting mode is selected in response to a turn signal being input during the first light emitting mode.

3. The lamp of claim 1, wherein in the first light emitting mode, a brightness of the light generated from the plurality of light emitting areas is varied based on a function of the lamp unit.

4. The lamp of claim 1, wherein in the second light emitting mode, the control unit is configured to cause the plurality of light emitting areas to sequentially turn off the light of the first color, and to sequentially turn on the light of the second color.

5. The lamp of claim 1, wherein the control unit is configured to cause the lamp unit to operate in the second light emitting mode based on an operation signal that includes a turn-on period and a turn-off period repeated with a predetermined period, and
   wherein in the second light emitting mode,
      during a first time segment of the turn-on period, the light of the first color is turned off and the light of the second color is turned on sequentially from the plurality of light emitting areas,
      during a second time segment of the turn-on period, which follows the first time segment of the turn-on period, the light of the second color is generated from the plurality of light emitting areas, and
      during the turn-off period, the light of the first color is generated from the plurality of light emitting areas.

6. The lamp of claim 1,
   wherein the control unit is configured to simultaneously turn off the plurality of light emitting areas in which the light is generated in accordance with the first light emitting mode, and to subsequently operate the plurality of light emitting areas in the third light emitting mode.

7. The lamp of claim 6, wherein the mode determination unit is configured to determine that the third light emitting mode is selected in response to a turn signal being input during the first light emitting mode.

8. The lamp of claim 1, wherein the lamp unit comprises a plurality of light emitting units that form each of the plurality of light emitting areas, and wherein each of the plurality of light emitting units comprises:

a first light source to generate the light of the first color; and a second light source to generate the light of the second color.

9. The lamp of claim 8, wherein in response to the second light emitting mode being selected, the first light source of the first color is sequentially turned off, and the second light source of the second color is sequentially turned on, and wherein a time point when the first light source of the first color is turned off corresponds to a time point when the second light source of the second color is turned on.

10. The lamp of claim 8, wherein in response to the second light emitting mode being selected, the first light source of the first color is sequentially turned off, and the second light source of the second color is sequentially turned on, and wherein either one of a time point when the first light source of the first color is turned off or a time point when the second light source of the second color is turned on is earlier than the other.

11. The lamp of claim 10, wherein a delay time between the time point when the first light source of the first color is turned off and the time point when the second light source of the second color is turned on is equal to or less than about 100 ms.

12. The lamp of claim 1, further comprising:

a failure detection unit configured to detect a failure of the lamp unit, wherein in response to detecting the failure of the lamp unit while a turn signal is input, the control unit is configured to cause the plurality of light emitting areas to generate the light with one of the first color or the second color in unison.

13. The lamp of claim 12, wherein in response to detecting the failure of the lamp unit, the control unit is configured to cause plurality of light emitting areas to alternately generate the light of the first color in unison and the light of the second color in unison.

14. The lamp of claim 12, wherein in response to detecting the failure of the lamp unit, the control unit is configured to cause the plurality of light emitting areas to generate the light of the first color in unison.

15. The lamp of claim 1, wherein the first color is white, which is for a function of a position lamp or a daytime running lamp, and wherein the second color is yellow, which is for a function of a turn signal lamp.

16. A method of operating a lamp for vehicle comprising a plurality of light emitting areas each configured to generate light having a first color or a second color, the method comprising:

generating light in the plurality of light emitting areas in a first light emitting mode, in which the light of the first color is generated in each of the plurality of light emitting areas;

during a first time segment of a turn-on period, changing the light in each of the plurality of light emitting areas from the first color to the second color in either one of a second light emitting mode or a third light emitting mode;

during a second time segment of the turn-on period, which follows the first time segment of the turn-on period, generating the light of the second color in each of the plurality of light emitting areas; and changing the light in each of the plurality of light emitting areas from the second color to the first color simultaneously and sustaining the light of the first color during a turn-off period, wherein the first time segment of the turn-on period is initiated in response to a turn signal being input, and thereafter, the first time segment of the turn-on period, the second time segment of the turn-on period, and the turn-off period are repeated, wherein, in the second light emitting mode, the light generated from each of the plurality of light emitting areas is changed from the first color to the second color sequentially from a first side to a second side along an arrangement direction of the plurality of light emitting areas, and wherein, in the third light emitting mode, after the light of the first color is turned off simultaneously the light of the second color is sequentially generated from the plurality of light emitting areas from the first side to the second side, and wherein for the first time segment of the turn-on period, the second light emitting mode or the third light emitting mode is selected based on a brightness of the light generated from the plurality of light emitting areas during the first light emitting mode.

17. The method of claim 16, further comprising:

in response to detecting a failure of the lamp while the turn signal is input, alternately generating the light of the second color in unison during the turn-on period and the light of the first color in unison during the turn-off period from the plurality of light emitting areas.

18. The method of claim 16, further comprising:

in response to detecting a failure of the lamp while the turn signal is input, generating the light with one of the first color or the second color in unison from the plurality of light emitting areas until the failure is resolved.

19. The method of claim 16, further comprising:

in response to detecting a failure of the lamp while the turn signal is input, generating the light of the first color in unison from the plurality of light emitting areas until the failure is resolved.

* * * * *